(12) United States Patent
Min et al.

(10) Patent No.: US 7,491,454 B2
(45) Date of Patent: Feb. 17, 2009

(54) ALL-IN-ONE TYPE HYBRID FUEL CELL SYSTEM

(75) Inventors: Myoung-Ki Min, Suwon-si (KR); Ho-Jin Kweon, Suwon-si (KR)

(73) Assignee: Samsung SDI Co., Ltd., Suwon-si, Gyeonggi-do (KR)

(*) Notice: Subject to any disclaimer, the term of this patent is extended or adjusted under 35 U.S.C. 154(b) by 395 days.

(21) Appl. No.: 11/344,165

(22) Filed: Feb. 1, 2006

(65) Prior Publication Data

US 2006/0172158 A1 Aug. 3, 2006

(30) Foreign Application Priority Data

Feb. 2, 2005 (KR) .................. 10-2005-0009427

(51) Int. Cl.
*H01M 12/00* (2006.01)
*H01M 8/10* (2006.01)
*H01M 2/00* (2006.01)
*H01M 4/00* (2006.01)
*H01M 8/18* (2006.01)

(52) U.S. Cl. ............... 429/9; 429/32; 429/34; 429/40; 429/19

(58) Field of Classification Search ............ 429/9, 429/19, 32, 34
See application file for complete search history.

(56) References Cited

U.S. PATENT DOCUMENTS

| | | | |
|---|---|---|---|
| 3,709,736 A * | 1/1973 | Adlhart et al. | 429/24 |
| 4,599,282 A * | 7/1986 | Hirota et al. | 429/26 |
| 6,613,470 B1 * | 9/2003 | Sugita et al. | 429/38 |
| 2005/0266278 A1 * | 12/2005 | Jung et al. | 429/7 |

* cited by examiner

*Primary Examiner*—Patrick Ryan
*Assistant Examiner*—Thomas H. Parsons
(74) *Attorney, Agent, or Firm*—Robert E. Bushnell, Esq.

(57) ABSTRACT

A hybrid fuel cell system includes a fuel supply unit for supplying a fuel containing hydrogen, an oxygen supply unit for supplying oxygen, at least one electricity generation unit for generating electricity through an electrochemical reaction of the fuel supplied by the fuel supply unit and the oxygen supplied by the oxygen supply unit, and at least one electrochemical capacitor disposed in the electricity generation unit.

21 Claims, 7 Drawing Sheets

ALL-IN-ONE TYPE HYBRID FUEL CELL SYSTEM

CLAIM OF PRIORITY

This application makes reference to, incorporates the same herein, and claims all benefits accruing under 35 U.S.C. § 119 from an application for HYBRID FUEL CELL SYSTEM earlier filed in the Korean Intellectual Property Office on 2 Feb. 2005 and there duly assigned Serial No. 10-2005-0009427.

BACKGROUND OF THE INVENTION

1. Field of the Invention

The present invention relates to a hybrid fuel cell system, and more particularly, to an all-in-one hybrid fuel cell system including an electricity generation unit having an electrochemical capacitor capable of reducing a size thereof, having a high power density and a high energy density, and coping with a rapid output change.

2. Description of the Related Art

In general, a fuel cell system is an electricity generating system which directly converts chemical reaction energy of oxygen and hydrogen contained in a hydrocarbon material such as methanol, ethanol, and a natural gas into an electrical energy. The fuel cell is classified into a high temperature fuel cell and a low temperature fuel cell according to an operating temperature.

As examples of the high temperature fuel cell, there are a molten carbonate fuel cell (MCFC), and a solid oxide fuel cell (SOFC). As examples of the low temperature fuel cell, there are an alkaline fuel cell (AFC), a phosphoric acid fuel cell (PAFC), a polymer electrolyte fuel cell (PEMFC), and a direct liquid fuel cell (DLFC).

All the fuel cells are constructed with the same principle. The fuel cells may be classified into various types according to fuel types, operating temperatures, catalysts, electrolytes, and the like.

The polymer electrolyte membrane fuel cell (PEMFC) recently developed has an excellent output characteristic, a low operating temperature, and fast starting and response characteristics. In addition, the polymer electrolyte fuel cell advantageously has a wide range of applications including a mobile power source for vehicles, a distributed power source for home or buildings, and a small-sized power source for electronic apparatuses.

In the polymer electrolyte fuel cell, a fuel pump operates to supply a fuel stored in a fuel tank to a reformer, and the reformer reforms the fuel to generate hydrogen. A stack of the polymer electrolyte fuel cell performs electro-chemical reaction of the hydrogen and oxygen to generate electrical energy. In order to supply the oxygen to the stack, a unit for forcibly fanning an air containing the oxygen may be connected.

The reformer is a unit for generating the hydrogen from the fuel containing the hydrogen through a chemical catalytic reaction using thermal energy. Since the reforming gas generated by the reformer contains a small amount of carbon monoxide (CO) as well as the hydrogen, a unit for removing the carbon monoxide is additionally provided.

Since the direct liquid fuel cell (DLFC) directly uses an organic compound liquid fuel such as methanol and ethanol, the direct liquid fuel cell does not require peripheral units such as a reformer. The direct liquid fuel cell has advantages in easily storing and supplying the fuel and having high energy and electric power densities. A direct liquid fuel cell using methanol as a fuel is called a direct methanol fuel cell (DMFC).

In the direct liquid fuel cell (DLFC), a fuel pump operates to supply a fuel stored in a fuel tank to a stack, and the stack performs an electrochemical reaction of an organic compound liquid fuel such as methanol and oxygen as an oxidant to generate electrical energy. In order to supply the oxygen to the stack, a unit for forcibly fanning an air containing the oxygen is connected.

In the fuel cell system such as a polymer electrolyte fuel cell (PEMFC) and a direct liquid fuel cell (DLFC), the stack which substantially generates electricity includes several to ten stacked unit cells. Each unit cell includes a membrane electrode assembly (MEA) and separators attached on both sides of the membrane electrode assembly. The membrane electrode assembly includes an anode, a cathode, and an electrolyte membrane interposed therebetween.

The separators separate the membrane electrode assemblies. In addition, the separators function as paths for supplying the hydrogen and the oxygen required for the reaction in the fuel cell to the anode and the cathode of the membrane electrode assembly, respectively, and as a conductor for directly connecting the anode and the cathode of the membrane electrode assembly.

Namely, the hydrogen is supplied to the anode through the separators, and the oxygen is applied to the cathode through the separators. In the meantime, an oxidation reaction of the hydrogen by a catalyst occurs in the anode, and a reduction reaction of the oxygen by a catalyst occurs in the cathode. As a result, generated electrons move to generate electricity, and heat and water are generated.

Recently, many attempt to use the fuel cell as a power source for a portable electronic apparatuses such as a mobile phone, a camcorder, and a laptop computer have been made.

As the portable electronic apparatuses for bi-directional communication, satellite mobile communication, a compact disc player, and a laptop computer have high performance, the apparatuses require a high instantaneous pulse power and a high current density. However, there is a problem in that the conventional fuel cell cannot satisfy the requirement. In addition, there is another problem in that the use time of the fuel cell is shortened.

Therefore, in order to supply the high instantaneous pulse power or the high current density required by the portable electronic apparatuses, there has been proposed a capacitor which is separately provided in addition to the fuel cell.

However, the capacitor has shortcomings of a low energy density. In addition, there is a problem in that a whole construction of the apparatus is complicated.

SUMMARY OF THE INVENTION

The present invention provides an all-in-one hybrid fuel cell system including an electricity generation unit having an electro-chemical capacitor capable of reducing a size thereof, having a high power density and a high energy density, and coping with a rapid output change.

According to an aspect of the present invention, a hybrid fuel cell system includes a fuel supply unit for supplying a fuel, an oxygen supply unit for supplying oxygen, at least one electricity generation unit for generating electricity through an electro-chemical reaction of the fuel supplied by the fuel supply unit or the hydrogen generated from the fuel and the oxygen supplied by the oxygen supply unit, and at least one electrochemical capacitor disposed in the electricity generation unit.

The electro-chemical capacitor may be constructed in a shape of the membrane electrode assembly. In addition, the electro-chemical capacitor may be connected to the electricity generation units in series or in parallel so as to constitute the stack of the fuel cell.

In the above aspect, the hybrid fuel cell system may further include a reforming unit for generating a reforming gas containing the hydrogen from the fuel supplied by the fuel supply unit and supplying the reforming gas to the electricity generation unit.

The electro-chemical capacitor may store charges by using an electric-double-layer capacitance formed by charge separation due to an electrostatic attractive force in an electric double layer in a vicinity of an electrode/electrolyte interface and a pseudo-capacitance formed by a reversible Faradaic surface redox (reduction-oxidation) reaction in the electrode/electrolyte interface.

The electro-chemical capacitor may be an electro-chemical double-layer capacitor (EDLC) implemented by an electric-double-layer capacitance or a super-capacitor implemented by a pseudo-capacitance.

The hybrid fuel cell system according to the present invention may be constructed in an all-in-one type where the stack is constructed with the capacitors as well as the electricity generation unit.

In the hybrid fuel cell system according to the present invention, a temperature of a whole stack can be prevented from rising unlike a stack which is constructed with only the electricity generation unit, so that it is possible to improve an efficiency of the whole fuel cell system as well as the stack.

In addition, in the hybrid cell system according to the present invention, the capacitor is disposed within the stack instead of being disposed to be separated from the stack, so that it is possible to minimize a volume of the whole fuel cell system.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

A hybrid fuel cell system according an embodiment of the present invention will be described in detail with reference to the accompanying drawings.

Figure 1:
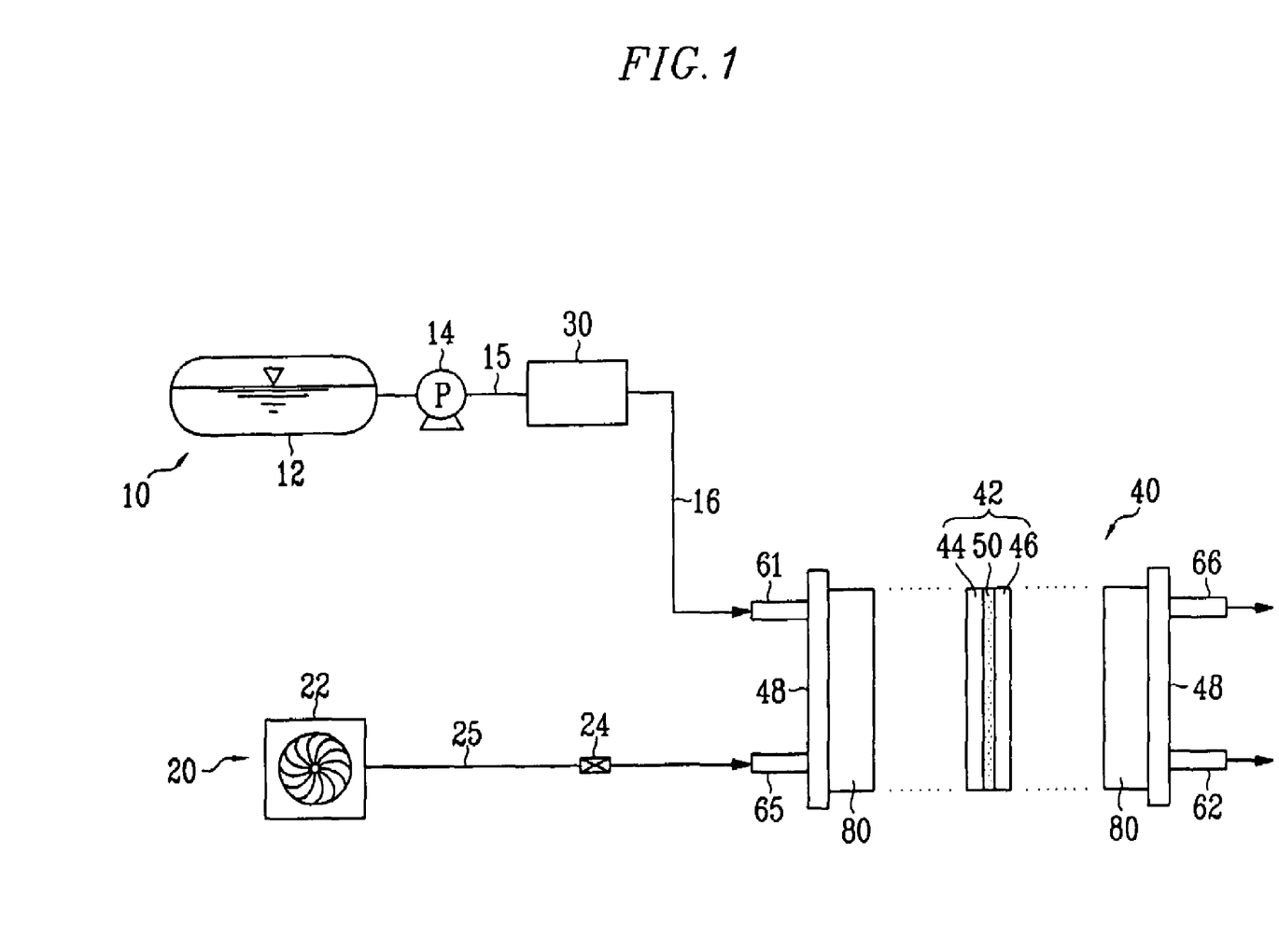
FIG. 1 is a schematic view showing a hybrid fuel cell system according to an embodiment of the present invention.
Figure 2:
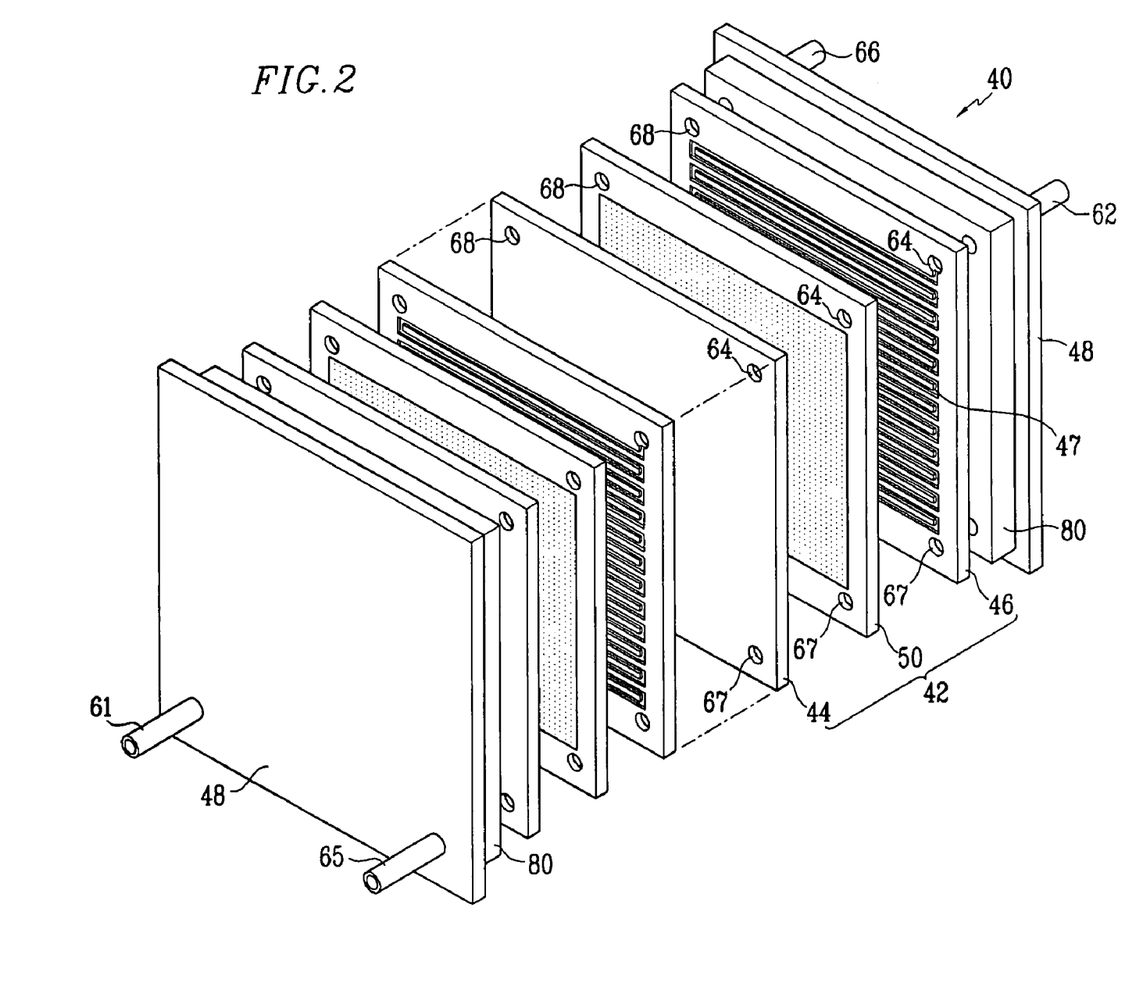
FIG. 2 is a perspective exploded view showing an electricity generation unit of the hybrid fuel cell system according to the embodiment of the present invention.
Figure 3:
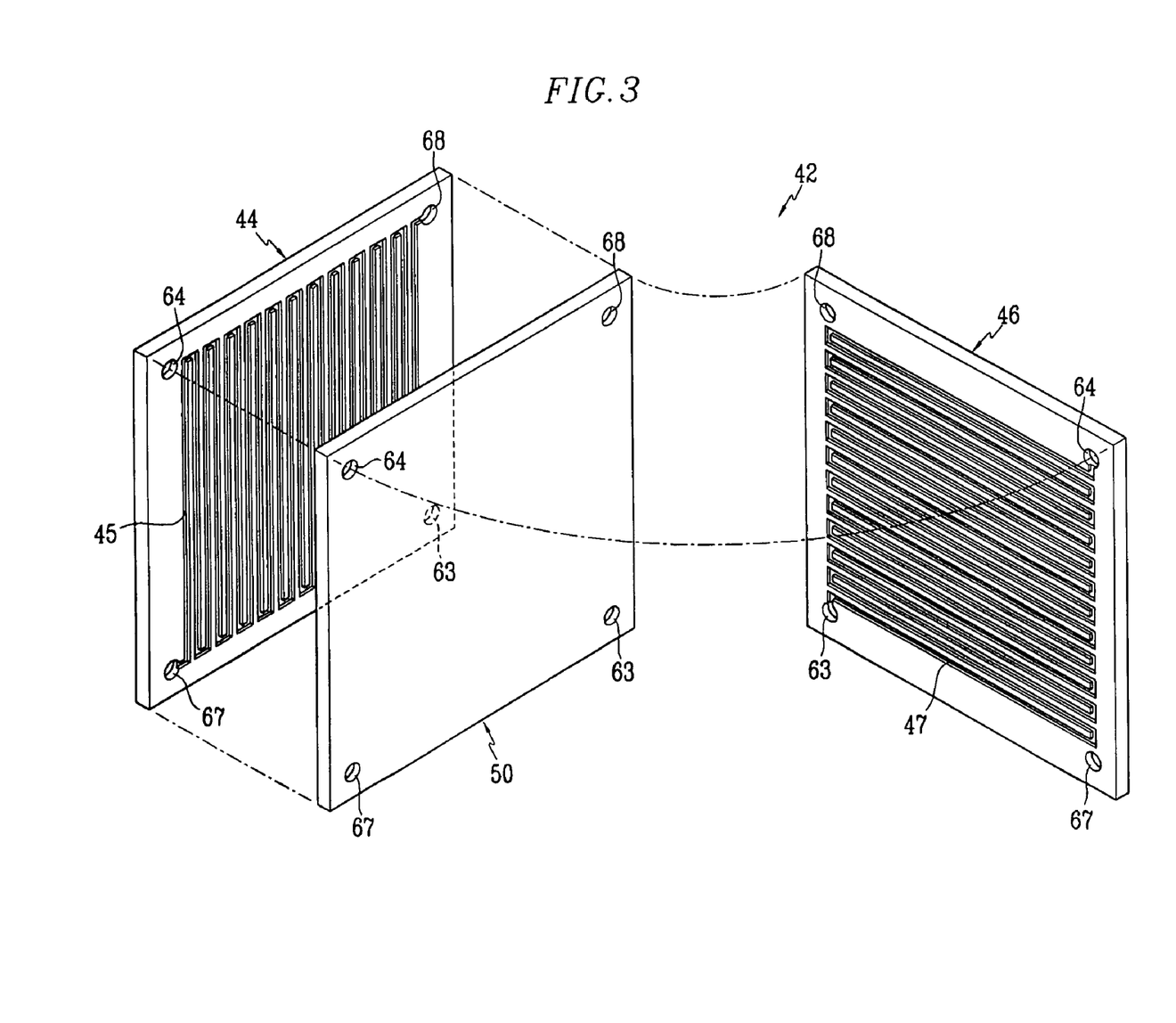
FIG. 3 is a perspective exploded view showing a construction of a separator of the hybrid fuel cell system according to the embodiment of the present invention.

Referring to FIGS. 1 to 3, the hybrid fuel cell system according to an embodiment of the present invention includes a fuel supply unit 10 for supplying a fuel containing hydrogen, an oxygen supply unit 20 for supplying oxygen, a reforming unit 30 for generating the hydrogen from the fuel supplied by the fuel supply unit 10, at least one electricity generation unit 40 for generating electricity through an electro-chemical reaction of the hydrogen supplied by the reforming unit 30 and the oxygen supplied by the oxygen supply unit 20, and at least one electro-chemical capacitor 80 disposed in the electricity generation unit 40.

The embodiment of the present invention shown in FIGS. 1 to 3 is a polymer electrolyte membrane fuel cell (PEMFC) which reforms the fuel containing the hydrogen to generate hydrogen and performs the electro-chemical reaction of the hydrogen and the oxygen to generate electrical energy.

The fuel supplied by the fuel supply unit 10 is a fuel containing hydrogen such as methanol, ethanol, and a natural gas. Hereinafter, the fuel is called a liquid fuel for the convenience of description.

The oxygen supply unit 20 supplies the oxygen which reacts with the hydrogen contained in the fuel. Alternatively, a pure oxygen stored in separate storage means may be used. Alternatively, an air containing the oxygen, for example, the atmospheric air, may be used. Hereinafter, the air is used as an oxygen source for the convenience of description.

The reforming unit 30 generates the reforming gas containing the hydrogen from the fuel through a chemical catalytic reaction (steam reformer (SR) catalytic reaction) using thermal energy and reducing a concentration of carbon monoxide (CO) contained in the reforming gas by using various reforming structures. For example, the reforming unit 30 may generate the reforming gas containing the hydrogen from the fuel through a catalytic reaction such as a steam reforming reaction, a partial oxidation reaction, and an auto-thermal reaction. In addition, the reforming unit 30 may reduce the concentration of carbon monoxide (CO) contained in the reforming gas by using a catalytic reaction such as a water-gas shift (WGS) reaction and a preferential CO oxidation (PROX) reaction or a hydrogen purification reaction using a separating membrane.

The fuel supply unit 10 includes a fuel tank 12 for storing the fuel containing the hydrogen and a fuel pump 14 connected to the fuel tank 12 to supply the fuel stored in the fuel tank 12 to the reforming unit 30.

The fuel tank 12 and the reforming unit 30 are connected with a fuel supply line 15 having a shape of a pipe.

The oxygen supply unit 20 includes a fanning unit 22 for sucking or suctioning the air with a predetermined pumping force and supplying the air to the electricity generation unit 40.

A fan mounted on an external apparatus connected to the fuel cell system according to the present invention such as a portable electronic apparatus, for example, a notebook PC (personal computer), may be used for the fanning unit 22. The fanning unit 22 is not limited to such a fan, but a conventional air pump or fan may be used.

The fanning unit 22 and the electricity generation unit 40 are connected with an air supply line 25. Preferably, a flow rate regulating valve 24 for regulating a flow rate of the supplied air is provided to the air supply line 25.

The flow rate regulating valve 24 may be a general solenoid valve which can selectively open and close a path of the air supply line 25 according to a control signal applied by separate control means.

The electricity generation unit 40 is connected to an external apparatus such as a driving unit of an electric car or a hybrid car, a laptop computer, a mobile phone, PDA (personal digital assistant), and a camcorder to apply a driving voltage thereto.

The electrochemical capacitor 80 stores charges by using an electric-double-layer capacitance formed by charge separation due to an electrostatic attractive force in an electric double layer in a vicinity of an electrode/electrolyte interface and a pseudo-capacitance formed by a reversible Faradaic surface redox (reduction-oxidation) reaction in the electrode/electrolyte interface.

The electro-chemical capacitor 80 is an electrochemical double-layer capacitor (EDLC) implemented by an electric-double-layer capacitance, a super-capacitor implemented by a pseudo-capacitance, or the like.

The electro-chemical capacitor 80 has a lower energy density than a secondary battery. However, the electro-chemical capacitor 80 has a higher output density, so that the electro-chemical capacitor 80 can supply a high power energy and have a good performance in charging and discharging times and a cycle life.

The electro-chemical double-layer capacitor (EDLC) has a structure where an electrolyte is interposed between a pair of polarized electrodes. The electro-chemical double-layer capacitor (EDLC) using an aqueous electrolyte has a capacitance of 10 $\mu F/cm^2$ to 40 $\mu F/cm^2$ and an electrode activation material having a high specific surface area can be used to implement a high capacitance.

A capacitance of the super-capacitor is about 10 to 100 times higher than that of the electrochemical double-layer capacitor (EDLC). The super-capacitor has a structure where an electrolyte is interposed between a pair of metal oxide electrodes.

In the super-capacitor, the eclectrolye is made of NAFION® and phosphoric acid matrix, and the metal oxide elctrodes are made of a metal oxide such as ruthenium oxide ($RuO_2$) and iridium oxide ($Iro_2$). In addition, in order to increase the capacitance of the super-capacitor, a nano-scale electrode activation material may be used as a material for the metal oxide electrodes.

The electro-chemical capacitor 80 may be implemented by using well-known constructions, and thus, detailed description thereof is omitted.

As shown in FIGS. 1 to 4, the electricity generation unit 40 includes membrane electrode assemblies 50, each of which has an anode 56, a cathode 52, and an electrolyte membrane 51 interposed therebetween and separators 44 and 46 which are disposed on both sides of each membrane electrode assembly 50.

One membrane electrode assembly 50 and a pair of the separators 44 and 46 disposed on both sides thereof constitute one stack 42. The electricity generation unit 40 is constructed with a stacked structure of a plurality of the stacks 42 (see FIGS. 1 and 2).

The stack 42 generates electrical energy through oxidation and reduction reactions of the hydrogen supplied from the reforming unit 30 and the air supplied by the oxygen supply unit 20.

The outmost ones of a plurality of the stacks 42 can be attaching plates 48 for attaching the stacks 42.

However, the present invention is not limited to the attaching plates 48. The attaching plates 48 can be eliminated, and the separators 44 and 46 disposed on the outmost ones of a plurality of the stacks 42 may have a function of attaching the stacks 42 instead of the attaching plates 48. In addition to the function of attaching the stacks 42, the attaching plates 48 may have the function of the separators 44 and 46.

Figure 4:
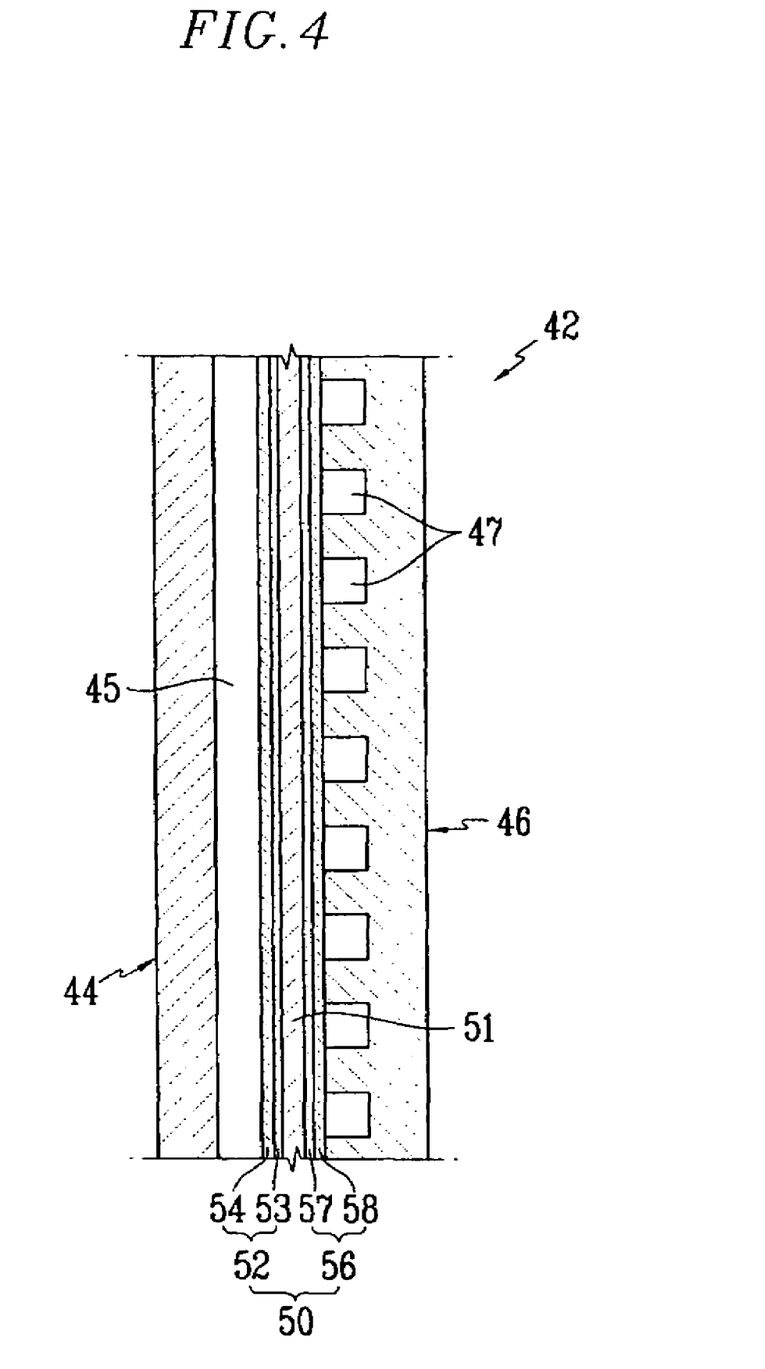
FIG. 4 is a partial enlarged cross sectional view showing a construction of a membrane electrode assembly of the hybrid fuel cell system according to the embodiment of the present invention.

FIG. 3 is a perspective exploded view showing a rotated state of the separator 44 and also a prospective exploded view showing the separator 46, shown in FIG. 2. FIG. 4 is a partial enlarged cross sectional view showing an assembled state of the membrane electrode assembly 50 and the separators 44 and 46 shown in FIG. 2.

Paths 45 and 47 are formed by attaching the separators 44 and 46 on the membrane electrode assembly 50. The paths 45 and 47 include a hydrogen path 47 formed on the anode side of the membrane electrode assembly 50 and an oxygen path 45 formed on the cathode side of the membrane electrode assembly 50.

In the aforementioned embodiment, two separators 44 and 46 are disposed between the membrane electrode assemblies 50 of the adjacent stacks 42, and the air (including oxygen) path 45 or the hydrogen path 47 are formed on the separators 44 and 46. However, the present invention is not limited to the construction. Namely, one separator may be disposed between the membrane electrode assemblies 50 of the adjacent stacks 42, and an air path and a hydrogen path may be formed on one side and the opposite side of the separator, respectively. This construction is equal to a construction where sides of two separators 44 and 46 on which the paths 45 and 47 are not formed, are attached.

The anode 56 is supplied with the hydrogen through the hydrogen path 47 of the separator 46. The anode 56 includes a catalyst layer 57 for performing an oxidation reaction of the hydrogen to decompose the hydrogen into electrons and hydrogen ions and a gas diffusion layer (GDL) 58 for smoothly moving the hydrogen into the catalyst layer 57. The catalyst layer 57 of the anode 56 is made of platinum (Pt) or a platinum-ruthenium (Pt—Ru) alloy having poison resistance to the carbon monoxide.

In a case where the catalyst layer 57 is made of platinum (Pt) or a platinum-ruthenium (Pt—Ru) alloy, the catalyst layer 57 has a unique characteristic of reducing a concentration of carbon monoxide through an oxygen adsorption function of inducing the oxidation reaction of the carbon monoxide.

The cathode 52 is supplied with the air through the air (including oxygen) path 45 of the separator 44. The cathode 52 includes a catalyst layer 53 for performing a reduction reaction of the oxygen contained in the air to decompose the oxygen into electrons and oxygen ions and a gas diffusion layer 54 for smoothly moving the oxygen into the catalyst layer 53.

The electrolyte membrane 51 is made of a solid polymer electrolyte having a thickness of 20 μm to 200 μm. The electrolyte membrane 51 has a function of moving the hydrogen ions generated in the catalyst layer 57 of the anode 56 to the catalyst layer 53 of the cathode 52 and an ion exchange function of recombining the hydrogen ions with the oxygen ions of the cathode 52 to form water.

As shown in FIGS. 1 and 2, the attaching plates 48 are provided with a first inlet 61 for supplying the hydrogen generated from the reforming unit 30 to the hydrogen path 47 of the separator 46, a second inlet 65 for supplying the air supplied by the oxygen supply unit 20 to the air path 45 of the separator 44, a first outlet 62 for venting non-reacted hydrogen from the anode 56 of the membrane electrode assembly 50, and a second outlet 66 for venting non-reacted air containing moisture generated by the recombining reaction of the hydrogen and the oxygen in the cathode 52 of the membrane electrode assembly 50.

The first inlet 61 is connected to the reforming unit 30 through the hydrogen supply line 16 having a shape of pipe, and the second inlet 65 is connected to the oxygen supply unit 20 through the air supply line 25.

The first inlet and outlet 61 and 62 are disposed at the diagonal corners, and the second inlet and outlet 65 and 66 are disposed at the diagonal corners.

Though-holes 63, 67, 64, and 68 are formed at the four corners of the separators 44 and 46 and the membrane electrode assemblies 50 to be connected to the first inlet 61, the second inlet 65, the first outlet 62, and the second outlet 66, respectively.

The through-hole 63 and the through-hole 64 are disposed at the diagonal corners of the separator 46 to be connected to the hydrogen path 47, and the through-hole 67 and the through-hole 68 are disposed at the diagonal corners of the separator 44 to be connected to the air path 45. In addition, the through-hole 63 and the through-hole 64 are constructed so as to be disconnected from the air path 45 of the separator 44, and the through-hole 67 and the through-hole 68 are constructed so as to be disconnected from the hydrogen path 47 of the separator 46.

According to the aforementioned construction, the fuel supplied by the fuel supply unit 10 passes through the reforming unit 30 to be reformed into the hydrogen, and the hydrogen generated from the reforming unit 30 flows through the hydrogen supply line 16 into the first inlet 61. Subsequently, the hydrogen passes through the through-hole 63 and the hydrogen path 47 to be oxidized in the anode 56 to be decomposed into electrons and hydrogen ions, and non-reacted hydrogen passes through the through-hole 64 to be vented out through the first outlet 62.

In addition, the air supplied by the air supply unit 20 passes through the air supply line 25 to flow into the second inlet 65. Subsequently, while the air passes through the through-hole 67 and the air path 45, the oxygen contained in the air is subject to a reduction reaction in the cathode 52 to be decomposed into electrons and oxygen ions, and non-reacted air passes through the through-hole 68 to be vented out through the second outlet 66.

As shown in FIG. 1, the electro-chemical capacitors 80 are interposed between the attaching plates 48 and the both ends of the stacked structure of the unit stacks 42, each of which is constructed with the membrane-electrode assembly 50 and the separators 44 and 46.

In the above construction, one, two or more electro-chemical capacitors 80 are interposed between one attaching plate 48 and one end of the stacked structure of the unit stacks 42.

Figure 5:
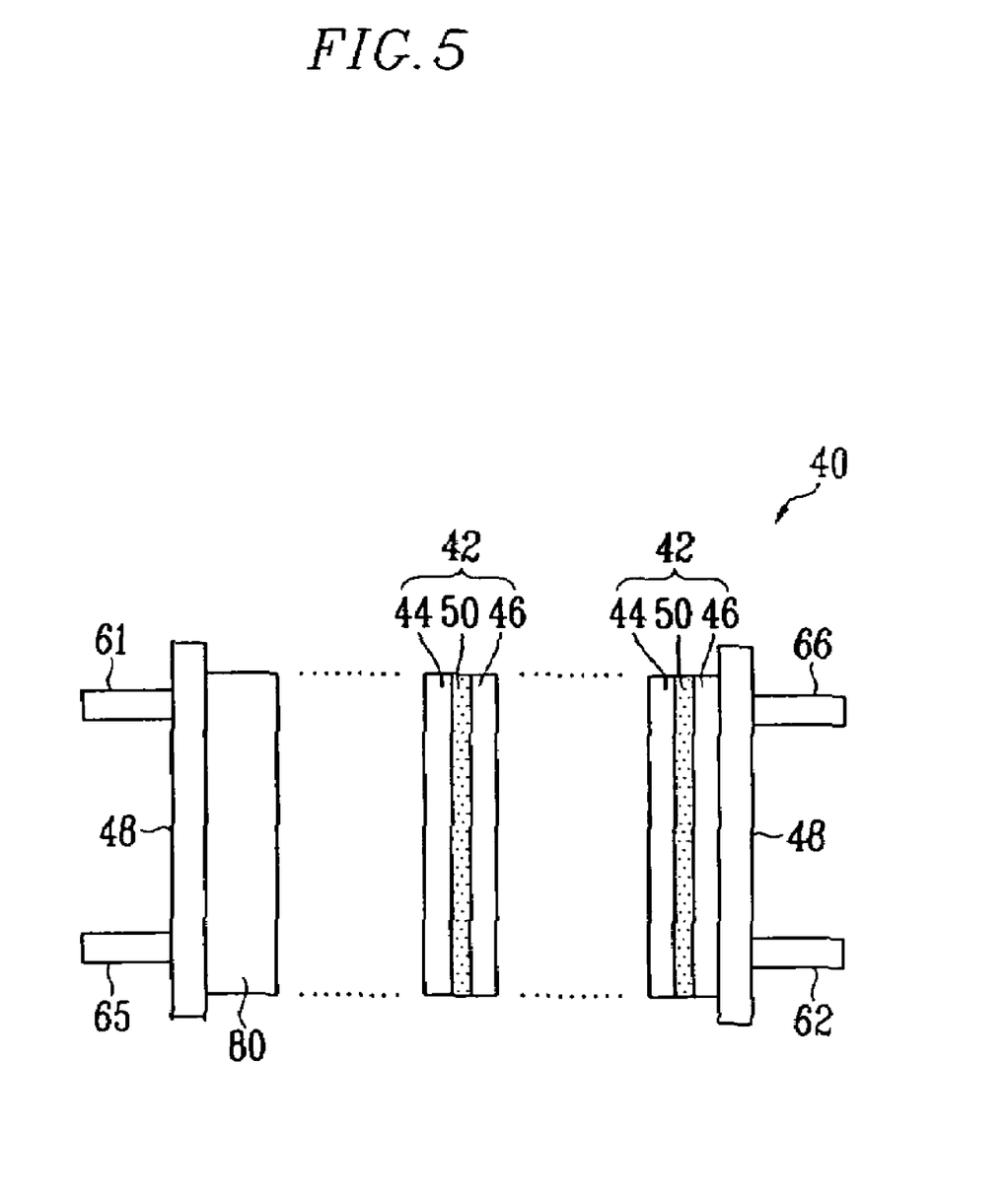
FIG. 5 is a side view showing the electricity generation unit where an electro-chemical capacitor which is disposed on one end of a stacked structure of a plurality of unit stacks in the hybrid fuel cell system according to the embodiment of the present invention.

Alternatively, as shown in FIG. 5, the electro-chemical capacitors 80 may be disposed on the one end of the stacked structure of the unit stacks. In this case, a plurality of the electro-chemical capacitors 80 may be disposed.

Figure 6:
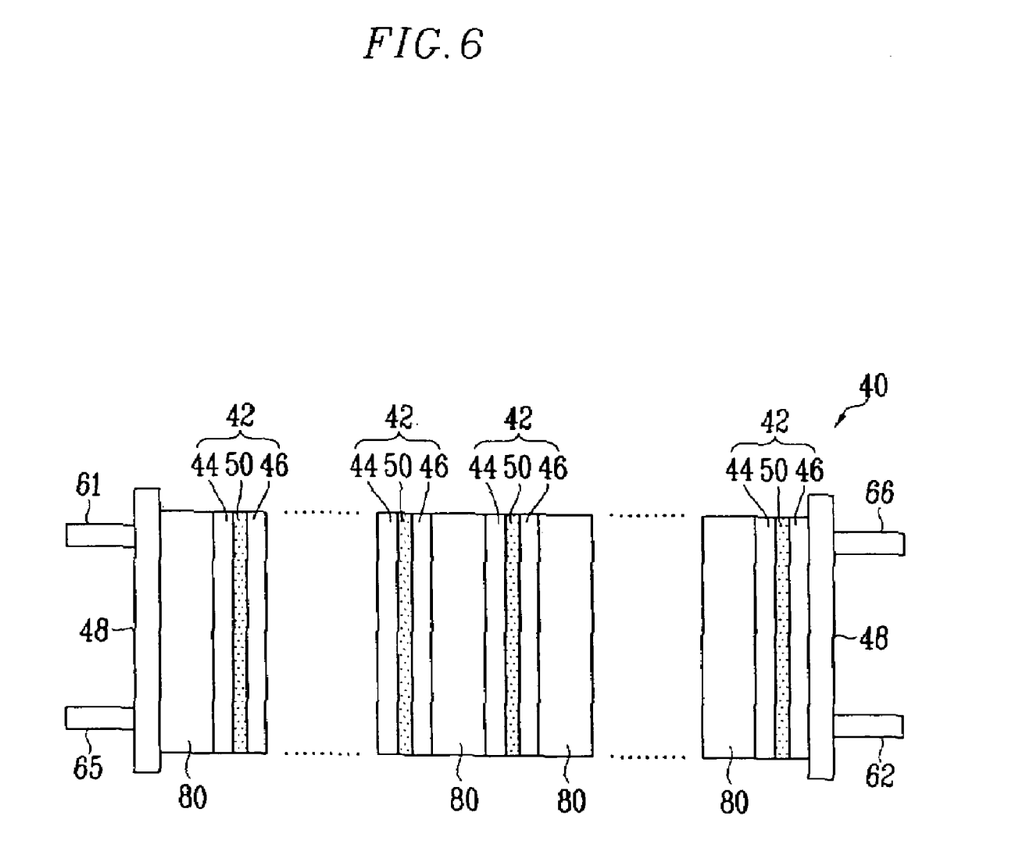
FIG. 6 is a side view showing the electricity generation unit where electro-chemical capacitors and a plurality of unit stacks are alternately disposed in the hybrid fuel cell system according to the embodiment of the present invention.

Alternatively, as shown in FIG. 6, the electro-chemical capacitors 80 and the unit stacks 42, each of which is constructed with the membrane-electrode assembly and the separators 44 and 46, can be alternately disposed.

By alternately disposing the electro-chemical capacitors 80 and the unit stacks 42 or disposing the electro-chemical capacitors 80 on one end of the stacked structure of the unit stack 42, it is possible to complementarily solve the problems of the low power density of the fuel cell and the low energy density of the electro-chemical capacitors 80. In addition, due to the rapid charging and discharging characteristics of the electro-chemical capacitors 80, it is possible to cope with a rapid output change of load. In addition, it is possible to optimize a performance of the fuel cell associated with a driving fore requiring for a high instantaneous output.

Now, a hybrid fuel cell system according to another embodiment of the present invention will be described with reference to FIG. 7. The hybrid fuel cell system includes a fuel supply unit 10 for supplying a fuel containing hydrogen, an oxygen supply unit 20 for supplying oxygen, at least one electricity generation unit 40 for generating electricity through an electro-chemical reaction of the fuel supplied by the fuel supply unit 10 and the oxygen supplied by the oxygen supply unit 20, and at least one electro-chemical capacitor 80 disposed in the electricity generation unit 40.

Figure 7:
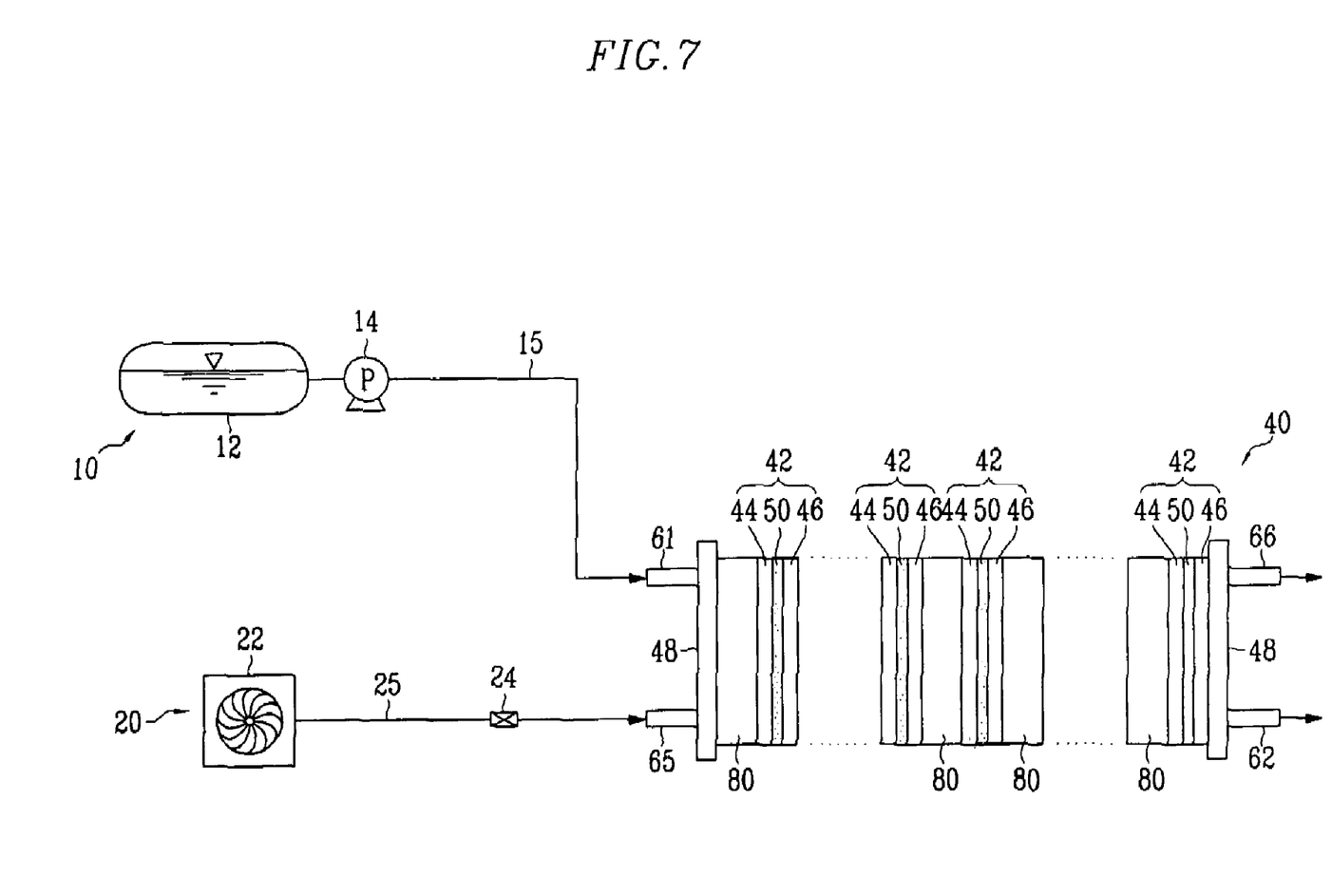
FIG. 7 is a schematic block diagram showing a hybrid fuel cell system according to another embodiment of the present invention.

The embodiment of the present invention shown in FIG. 7 is a direct liquid fuel cell (DLFC) or a direct methanol fuel cell (DMFC) which performs an electro-chemical reaction of an organic compound fuel such as methanol and ethanol and oxygen as an oxidant to generate electrical energy.

Excluding the reforming unit 30 as seen in FIG. 1, the embodiment as seen in FIG. 7 is similar to the above-described embodiment, and thus, detailed description thereof is omitted.

The components of the above-described embodiment not suitable for the direct liquid fuel cell (DLFC) can be replaced with general components of the direct liquid fuel cell (DLFC) or the direct methanol fuel cell (DMFC).

According to a hybrid fuel cell system of the present invention, it is possible to complementarily solve the problems of a low power density of a fuel cell and a low energy density of an electro-chemical capacitor. In addition, due to rapid charging and discharging characteristics of the electrochemical capacitor, it is possible to cope with a rapid output change of load. In addition, it is possible to optimize a performance of the fuel cell associated with a driving fore requiring for a high instantaneous output.

In addition, according to a hybrid fuel cell system of the present invention, since a high-capacitance electro-chemical capacitor is disposed in an electricity generation unit, it is possible to reduce a size of a whole fuel cell system and simplify a whole construction thereof in comparison to a conventional fuel cell system where a conventional electro-chemical capacitor is disposed outside of the conventional fuel cell system.

Although the exemplary embodiments and the modified examples of a hybrid fuel cell system according to the present invention have been described, the present invention is not limited to the embodiments and examples, but may be modified in various forms without departing from the scope of the appended claims, the detailed description, and the accompanying drawings of the present invention. Therefore, it is natural that such modifications belong to the scope of the present invention.

What is claimed is:

1. A hybrid fuel cell system comprising:
   a fuel supply unit for supplying a fuel;
   an oxygen supply unit for supplying oxygen;
   at least one electricity generation unit for generating electricity through an electro-chemical reaction of the fuel supplied by said fuel supply unit or a hydrogen generated from the fuel and the oxygen supplied by said oxygen supply unit; and
   at least one electro-chemical capacitor disposed in said electricity generation unit, with the electro-chemical capacitor being a super-capacitor.

2. The hybrid fuel cell system of claim 1, further comprising a reforming unit for generating a reforming gas containing the hydrogen from the fuel supplied by said fuel supply unit and supplying the reforming gas to said electricity generation unit.

3. The hybrid fuel cell system of claim 1, wherein said electro-chemical capacitor is a super-capacitor implemented by a pseudo-capacitance.

4. The hybrid fuel cell system of claim 1, wherein said fuel supply unit includes a fuel tank for storing the fuel containing the hydrogen and a fuel pump connected to the fuel tank to supply the fuel stored in said fuel tank.

5. The hybrid fuel cell system of claim 1, wherein said oxygen supply unit includes a fanning unit for suctioning the air including oxygen with a predetermined pumping force and supplying the air including oxygen to said electricity generation unit.

6. The hybrid fuel cell system of claim 1, wherein the electricity generation unit includes a stacked structure of a plurality of unit stacks, wherein each of the unit stacks includes a membrane electrode assembly having an anode, a cathode, and an electrolyte membrane interposed therebetween and separators disposed on both sides of the membrane electrode assembly and having paths which the hydrogen and air including oxygen pass through.

7. The hybrid fuel cell system of claim 6, wherein at least one of said electro-chemical capacitors are stacked on one end of the stacked structure of the unit stacks.

8. The hybrid fuel cell system of claim 6, said separators being at least two separators being disposed between said membrane electrode assemblies of adjacent stacks, and the air path or the hydrogen path are formed on the separators.

9. The hybrid fuel cell system of claim 6, with one separator being disposed between the membrane electrode assemblies of adjacent stacks, and an air path and a hydrogen path formed on one side and the opposite side of the separator, respectively.

10. The hybrid fuel cell system of claim 6, anode comprises:
a catalyst layer for performing an oxidation reaction of the hydrogen to decompose the hydrogen into electrons and hydrogen ions; and
a gas diffusion layer for uniformly moving the hydrogen into the catalyst layer.

11. The hybrid fuel cell system of claim 6, said cathode comprising: a catalyst layer for performing a reduction reaction of the oxygen contained in the air to decompose the oxygen into electrons and oxygen ions; and
a gas diffusion layer for uniformly moving the oxygen into the catalyst layer.

12. The hybrid fuel cell system of claim 6, further comprising a first and second inlet supplying the hydrogen and air, respectively, from a reforming unit to a hydrogen path and a first and second outlet venting non-reacted hydrogen and air, respectively, with said first inlet and outlet being disposed on diagonal corners of said separators and said second inlet and outlet being disposed on diagonal corners of said separators using through holes.

13. The hybrid fuel cell system of claim 1, wherein said super-capacitor has a structure where an electrolyte is interposed between a pair of metal oxide electrodes, the electrolyte phosphoric acid matrix, and the metal oxide electrodes are made of a metal oxide.

14. A hybrid fuel cell system comprising:
a fuel supply unit for supplying a fuel;
an oxygen supply unit for supplying oxygen;
at least one electricity generation unit for generating electricity through an electro-chemical reaction of the fuel supplied by said fuel supply unit or a hydrogen generated from the fuel and the oxygen supplied by said oxygen supply unit, wherein the electricity generation unit includes a stacked structure of a plurality of unit stacks, wherein each of the unit stacks includes a membrane electrode assembly having an anode, a cathode, and an electrolyte membrane interposed therebetween and separators disposed on both sides of the membrane electrode assembly and having paths which the hydrogen and air including oxygen pass through; and
at least one electro-chemical capacitor disposed in said electricity generation unit, wherein more than one said at least one of said electro-chemical capacitor are stacked on both ends of the stacked structure of the unit stacks.

15. A hybrid fuel cell system comprising:
a fuel supply unit for supplying a fuel;
an oxygen supply unit for supplying oxygen;
at least one electricity generation unit for generating electricity through an electro-chemical reaction of the fuel supplied by said fuel supply unit or a hydrogen generated from the fuel and the oxygen supplied by said oxygen supply unit, wherein the electricity generation unit includes a stacked structure of a plurality of unit stacks, wherein each of the unit stacks includes a membrane electrode assembly having an anode, a cathode, and an electrolyte membrane interposed therebetween and separators disposed on both sides of the membrane electrode assembly and having paths which the hydrogen and air including oxygen pass through; and
at least one electro-chemical capacitor disposed in said electricity generation unit, wherein said electro-chemical capacitors and the unit stacks are alternately stacked.

16. An apparatus, comprising:
an electricity generation unit for generating electricity through an electro-chemical reaction of the fuel supplied by a fuel supply unit or hydrogen generated from the fuel and the oxygen supplied by a gas from an oxygen supply unit; and
a plurality of electro-chemical capacitors disposed in said electricity generation unit.

17. The hybrid fuel cell system of claim 16, further comprising a reforming unit for generating a reforming gas containing the hydrogen from the fuel supplied by the fuel supply unit and supplying the reforming gas to said electricity generation unit.

18. The hybrid fuel cell system of claim 16, wherein said plurality of electro-chemical capacitors are each an electro-chemical double-layer capacitor implemented by an electric-double-layer capacitance or a super-capacitor implemented by a pseudo-capacitance, and the electro-chemical capacitors and the unit stacks are alternately stacked.

19. The hybrid fuel cell system of claim 16, wherein said oxygen supply unit comprises a fan unit for suctioning the gas including oxygen with a predetermined pumping force and supplying the gas including oxygen to the electricity generation unit, and at least one of the electro-chemical capacitors are stacked on one end of the stacked structure of the unit stacks.

20. The hybrid fuel cell system of claim 16, wherein said electricity generation unit includes a stacked structure of a plurality of unit stacks, wherein each of the unit stacks includes a membrane electrode assembly having an anode, a cathode, and an electrolyte membrane interposed therebetween and separators disposed on both sides of the membrane electrode assembly and having paths which the hydrogen and the gas including oxygen pass through, with at least two of the electro-chemical capacitors being stacked on opposite ends of the stacked structure of the unit stacks.

21. A hybrid fuel cell system comprising:
 a fuel supply unit for supplying a fuel;
 an oxygen supply unit for supplying oxygen;
 a plurality of electricity generation units for generating electricity through an electro-chemical reaction of the fuel supplied by said fuel supply unit or a hydrogen generated from the fuel and the oxygen supplied by said oxygen supply unit, with at least one of the electricity generation units comprising a stacked structure of a plurality of unit stacks, wherein each of the unit stacks includes a membrane electrode assembly having an anode, a cathode, and an electrolyte membrane interposed therebetween and separators disposed on both sides of the membrane electrode assembly and having paths which the hydrogen and air including oxygen pass through; and
 a plurality of electro-chemical capacitors disposed in each of said electricity generation units, with the electro-chemical capacitors being disposed in one form selected from being stacked at both ends of the stacked structure of the unit stacks, being stacked on one end of the stacked structure of the unit stacks, and alternating between unit stacks, with at least one of the electro-chemical capacitors being an electro-chemical double-layer capacitor implemented by an electric-double-layer capacitance or a super-capacitor implemented by a pseudo-capacitance.

* * * * *